(12) United States Patent
Medrano et al.

(10) Patent No.: US 7,420,450 B2
(45) Date of Patent: Sep. 2, 2008

(54) APPARATUS FOR PROVIDING SUPERVISORY SIGNAL FOR A SOLENOID

(76) Inventors: Jorge Medrano, P.O. Box 875, Cypress, TX (US) 77410-0875; Henry Munoz, P.O. Box 875, Cypress, TX (US) 77410-0875

( * ) Notice: Subject to any disclaimer, the term of this patent is extended or adjusted under 35 U.S.C. 154(b) by 343 days.

(21) Appl. No.: 11/380,092

(22) Filed: Apr. 25, 2006

(65) Prior Publication Data

US 2007/0247265 A1 Oct. 25, 2007

(51) Int. Cl.
*H01F 27/29* (2006.01)
(52) U.S. Cl. ........................... 335/282; 336/192
(58) Field of Classification Search ............. 335/282, 335/299; 336/192, 198
See application file for complete search history.

(56) References Cited

U.S. PATENT DOCUMENTS 3,215,905 A * 11/1965 Bloom ................ 335/282

| 5,433,244 | A | 7/1995 | Sule |
| 5,477,149 | A | 12/1995 | Spencer |
| 6,810,910 | B2 | 11/2004 | McHugh |
| 6,932,317 | B2 | 8/2005 | Gnadinger |

\* cited by examiner

*Primary Examiner*—Ramon M Barrera
(74) *Attorney, Agent, or Firm*—Keeling Patents & Trademarks, LLC; Kenneth A. Keeling

(57) ABSTRACT

There is provided an electric solenoid for a building fire suppression system that provides a supervisory or warning signal when the solenoid is removed from its service location. The primary coil winding of the solenoid extends through a base that is detachable from the solenoid. The base remains fixed in place at the service location for the solenoid. When the solenoid is properly installed on the base, a conductor in the base provides the connection to complete the solenoid coil circuit, making it operational. When the solenoid is removed from the base, the coil circuit is interrupted. Connected circuitry that interfaces with the solenoid coil circuit provides a supervisory signal to a remote location, a local location, or both, when the coil circuit is interrupted. When the solenoid is properly installed on the base, a coil spring urges and biases the base firmly against the solenoid to maintain electrical contact between the base and the solenoid.

20 Claims, 3 Drawing Sheets

APPARATUS FOR PROVIDING SUPERVISORY SIGNAL FOR A SOLENOID

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to solenoids, and, more specifically, to an electric solenoid capable of providing a supervisory warning signal in the event that the solenoid is removed from its service location.

2. Description of the Related Art

Modern commercial and industrial buildings rely on water sprinkler systems for the first fire suppression response in the event of a building fire. Areas of buildings that contain sensitive equipment or documents that would be damaged by water are commonly provided with a "preaction" or "dry" sprinkler system to minimize the risk of accidental release of water. Preaction fire suppression sprinkler systems commonly utilize electric solenoids to automatically open valves and pressurized water lines so as to supply water to sprinkler heads at the location of a detected fire. Typically a localized building fire is first detected by a heat or a smoke detector installed in the building. The activated heat or smoke detector provides a fire signal to the preaction sprinkler control system. The control system in turn energizes one or more electric solenoids installed on associated valves in the fire suppression water lines, providing pressurized water to the sprinkler heads in the vicinity of the fire. These solenoids are commonly used in a wide variety of fire suppression systems, such as, but not limited to, preaction systems, carbon dioxide systems, clean agent systems, water mist systems, etc. These systems are commonly used in commercial, industrial, and marine applications.

The National Fire Protection Association (N.F.P.A.) mandates that fire suppression systems and their component parts be regularly tested. During the testing process, the solenoids are commonly removed for their inspection, testing, and replacement if necessary. The control valves on which the solenoids are installed are normally closed, and open only when the solenoid is energized by a fire signal. Therefore, during routine inspections, the solenoids must be removed from the valves to prevent a discharge of the water or other fire suppression product during testing.

After testing, if all the solenoids are not properly replaced on their valves and functional, the integrity of the fire suppression system is compromised. Typically, no indication or warning signal is provided to the fire suppression control panel when a solenoid has been removed, or has not been properly replaced after its removal. The N.F.P.A. requires that all fire protection circuits and equipment be continuously monitored and supervised at all times for their integrity.

A need therefore exists for an apparatus for providing such a supervisory or warning signal when any solenoid in the system is removed. Preferably, such an apparatus will automatically monitor whether each individual solenoid is properly installed and ready for operation, and will provide an indication to the fire protection control panel of which particular solenoid is not properly installed, so that corrective action can be taken quickly and efficiently.

BRIEF SUMMARY OF THE INVENTION

The present invention addresses the aforementioned need. According to one embodiment of the invention, a solenoid provides a supervisory signal when the solenoid is removed from a service location. The solenoid has an armature wire wound on a bobbin to form a coil. The solenoid base comprises an electrical conductor removably attachable to and detachable from the solenoid. The conductor has upper and lower surfaces. An upper insulating member is attached to the upper surface of the conductor. A lower insulating member is attached to the lower surface of the conductor. Two electrical contact are associated with the conductor. The electrical contacts complete an electrical circuit between the conductor and the armature wire when the solenoid is installed on the base. The electrical contacts break the electrical circuit, thereby providing a supervisory or warning signal, when the solenoid is removed from the base. A device is associated with the base for biasing the base against the solenoid. A retainer is associated with the solenoid for retaining the solenoid on the base.

According to an alternative embodiment of the invention, an electric solenoid provides a supervisory signal when the solenoid is removed from a service location. The solenoid includes a bobbin and an armature wire wound on the bobbin to form a coil. A base is removably attachable to and detachable from the solenoid. The base includes an electrical conductor and at least one electrical contact attached to the conductor. The electrical contacts complete an electric circuit between the conductor and the armature wire when the solenoid is installed on the base. The contacts break the electric circuit, thereby providing a supervisory signal, when the solenoid is removed from the base.

Accordingly, it is an object of the present invention to provide an electric solenoid or associated apparatus that automatically provides a supervisory or warning signal when any particular solenoid in a fire suppression system is removed from its service location. Preferably, such a solenoid or apparatus will automatically monitor whether each individual solenoid is properly installed, so that, should a solenoid be removed, an indication will be provided to maintenance personnel of which particular solenoid or solenoids requires attention.

Other objects of the invention are apparent from the following description, the claims set forth below, and the accompanying drawings.

BRIEF DESCRIPTION OF THE DRAWINGS

For a more complete understanding of the present invention and the advantages thereof, reference is now made to the following Detailed Description of an Example Embodiment of the Invention, taken in conjunction with the accompanying drawings, in which.

DETAILED DESCRIPTION OF AN EXAMPLE EMBODIMENT OF THE INVENTION

The apparatus of the present invention provides a portion of the primary coil winding of a solenoid extending through a base that is detachable from the solenoid. The base remains fixed in place at the service location for the solenoid. When the solenoid is properly installed on the base, a conductor in the base provides the connection to complete the solenoid coil circuit, making it operational. When the solenoid is removed from the base, the coil circuit is interrupted. Connected circuitry that interfaces with the solenoid coil circuit provides a supervisory or warning signal to a remote location, a local location, or both, when the coil circuit is interrupted.

Figure 1:
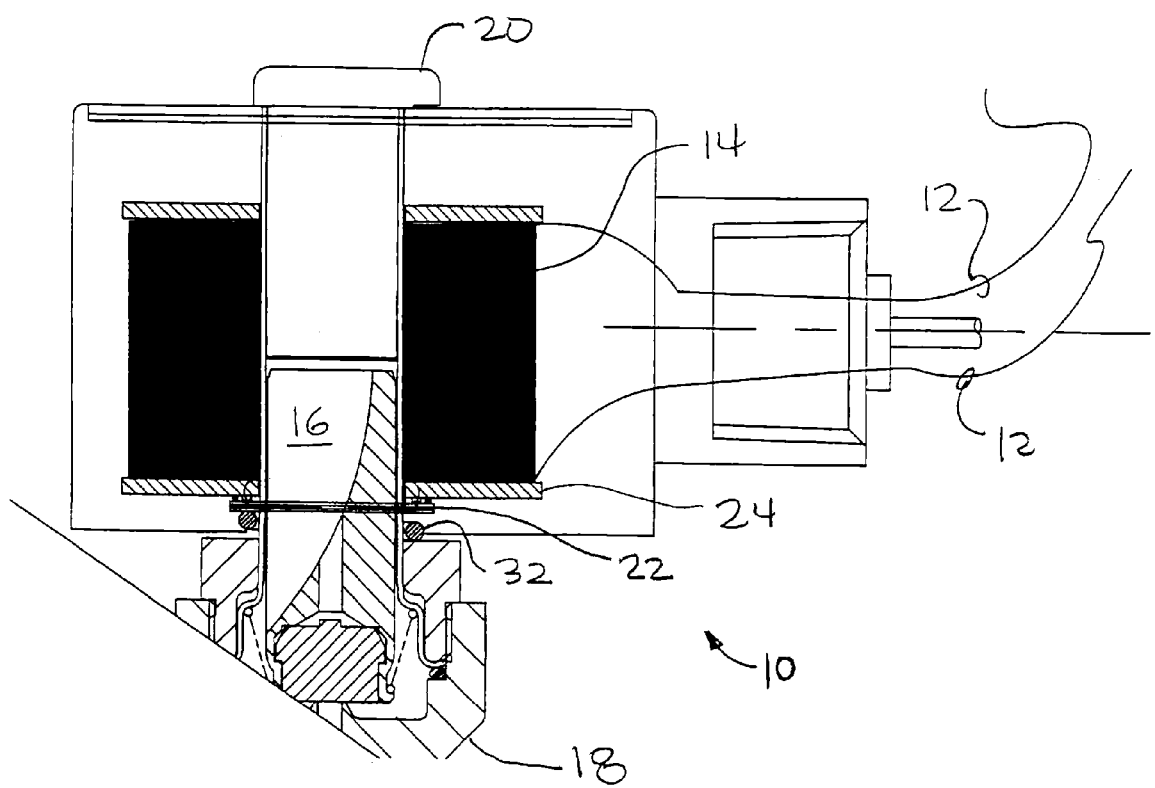
FIG. 1 is an elevation view in cross-section of a solenoid of the present invention with a portion of a control valve on which the solenoid is installed.

The invention and its advantages are best understood by referring to the drawings, like numerals being used for like and corresponding parts of the various drawings. In FIG. 1 there is shown in cross-section a solenoid, generally designated 10, according to an example embodiment of the invention. Also shown in FIG. 1 is a portion of a control valve 18 on which solenoid 10 is installed. Solenoid 10 includes a bobbin 24. An armature wire 12 is wound on bobbin 24 to form solenoid coil 14. When coil 14 is electrically energized, it magnetically retracts solenoid core 16 upward, into solenoid 10, thus opening control valve 18. Solenoid 10 is removably attachable to and detachable from a base 22.

Figure 2:
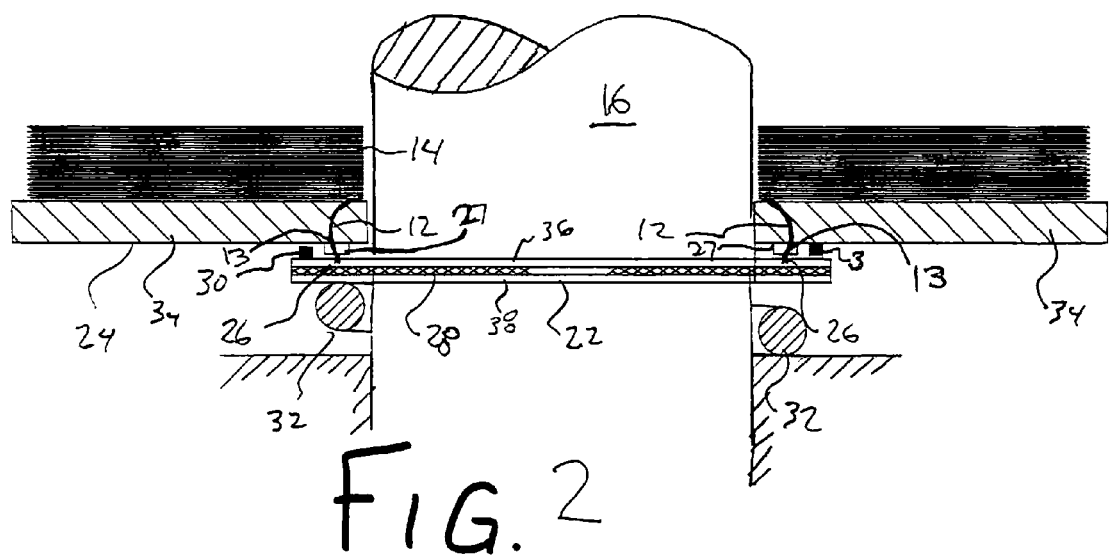
FIG. 2 is a cross-sectional view of a solenoid base and the lower portion of a solenoid of the present invention.

FIG. 2 is an enlarged cross-sectional view of solenoid base 22 and the lower portion of solenoid 10. Base 22 has the shape of a hollow cylinder to allow core 16 to extend through its open center. It is not necessary to the invention, however, that base 22 have this shape, so long as its structure permits the required movement of solenoid core 16 for operating control valve 18.

At the center of base 22 is electrical conductor 28. Two electrical contacts 26 on the upper surface of base 22 are attached to conductor 28. In the present invention armature wire 12 is not continuous but has an open segment between lower ends 13. Electrical contacts 27 are attached to the lower ends 13 of armature wire 12. When solenoid 10 is installed on base 22, electrical contacts 26 mate with electrical contacts 27, thus completing an electric circuit between conductor 28 and armature wire 12. The electric circuit of conductor 28 and armature wire 12 is broken when solenoid 10 is removed from base 22. Solenoid 10 is thus functional to operate control valve 18 only when it is installed on base 22.

When the circuit is broken by removal of solenoid 10 from base 22, connected circuitry (not illustrated) that interfaces with the solenoid coil circuit provides a warning or supervisory signal to a remote location, a local location, or both, indicating that the solenoid is removed from the base and is nonfunctional.

As best seen in FIG. 2, upper insulating member 36 is attached to the upper surface of conductor 28, and lower insulating member 38 is attached to the lower surface of conductor 28. Conductor 28 is thus "sandwiched" between upper and lower insulating members 36 and 38. In one example embodiment of the invention, upper and lower insulating members 36 and 38 comprise plastic insulation. Flexible members 30 are attached to upper insulating member 36 to allow compressive contact between base 22 and bobbin 24 without damage to base 22 or to bobbin 24. In example embodiments of the invention, flexible members 30 are rubber pads, felt pads, or coil springs, and four flexible members 30 are spaced around the circumference of base 22. The lower surface 34 of bobbin 24 is insulated to limit electric current flow to the desired path.

As seen in FIG. 1, coil spring 32 is located between solenoid base 22 and control valve 18. Spring 32 urges and biases base 22 firmly against solenoid 10 to maintain good electrical contact between contacts 26 on base 22 and contacts 27 on solenoid 10. Cap 20 retains solenoid 10 on base 22. Cap or nut 20 is removed from solenoid 10 when it is desired to remove solenoid 10 from base 22 for testing or servicing solenoid 10.

In another embodiment of the invention (not illustrated), base 22 remains physically attached to solenoid 10 at all times. However, when solenoid 10 is removed from its service location, flexible members 30 expand so as to electrically detach solenoid 10 from base 22, thus breaking the electric circuit through base 22. In such embodiment, at installation, cap 20 biases solenoid 10 against base 22 to overcome the force of flexible members 30 and to allow engagement of contacts 26 with contacts 27. In the appended claims, reference to "a base removably attachable to and detachable from the bobbin" or similar language is intended to encompass such cases in which the base is only electrically detachable from the bobbin, but remains physically attached.

Figure 3:
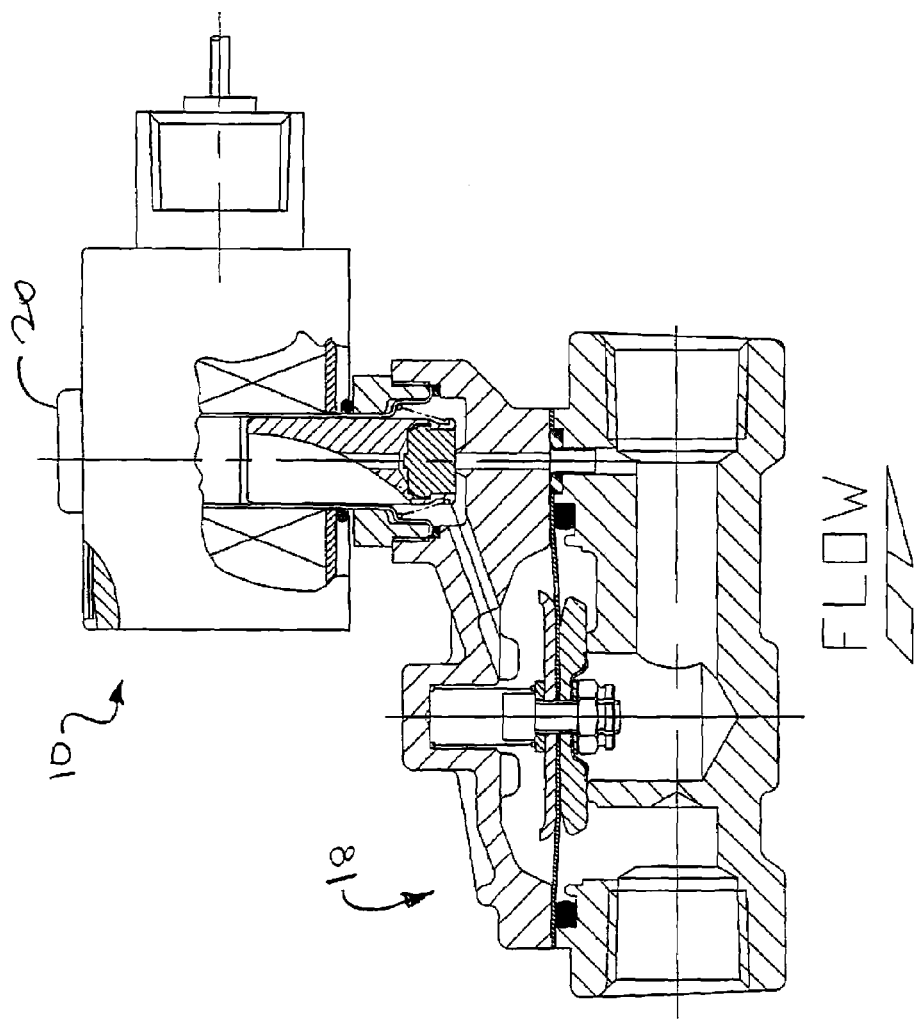
FIG. 3 is a side elevation view of the solenoid of FIG. 1 mounted on a control valve, partially in cross-section.

Referring to FIG. 3, solenoid 10 is seen in front elevation view as installed on base 22 (not illustrated) and on control valve 18. Referring to FIG. 4, solenoid 10 and control valve 18 are seen in side elevation view, partially in cross-section.

The solenoid and solenoid base of the present invention, and many of its intended advantages, will be understood from the foregoing description of an example embodiment, and it will be apparent that, although the invention and its advantages have been described in detail, various changes, substitutions, and alterations may be made in the manner, procedure, and details thereof without departing from the spirit and scope of the invention, as defined by the appended claims, or sacrificing any of its material advantages, the forms hereinbefore described being merely an exemplary embodiment thereof.

What is claimed is:

1. An electric solenoid of the type comprising a bobbin, an armature wire wound on the bobbin, and a core, the solenoid comprising:
   a base removably attachable to and detachable from the bobbin, the armature wire discontinuous proximate said base, the base including an electrical conductor, wherein the conductor and the armature wire comprise a continuous electrical circuit when the bobbin and base are attached.

2. The solenoid base of claim 1, wherein the base has the shape of a hollow cylinder.

3. The solenoid of claim 1, wherein the conductor has upper and lower surfaces, and further including an upper insulating member attached to the upper surface of the conductor, and a lower insulating member attached to the lower surface of the conductor.

4. The solenoid of claim 3, further including at least one flexible member attached to the upper insulating member to allow compressive contact between the base and the bobbin without damage to the base or to the bobbin.

5. The solenoid of claim 3, wherein the bobbin has upper and lower surfaces, and wherein the lower surface of the bobbin is insulated to limit electric current flow to the desired path.

6. The solenoid of claim 1, further including a device associated with the base for biasing the base against the bobbin.

7. The solenoid of claim 6, wherein the device is a coil spring.

8. The solenoid of claim 1, further including a retainer associated with the solenoid for retaining the bobbin on the base.

9. The solenoid of claim 8, wherein the retainer is a cap removable from the solenoid.

10. A method for alerting an operator when an electric solenoid is removed from a service location, the method comprising:
routing a portion of the primary coil winding of the solenoid through a base that is detachable from the solenoid and located at the service location, so that the solenoid coil circuit is completed when the solenoid is installed on the base;
removing the solenoid from the base and thereby interrupting the solenoid coil circuit; and
through a signal circuit interfaced with the solenoid coil circuit, providing a warning signal to the operator.

11. The method of claim 10, further including the steps of:
replacing the solenoid on the base thereby restoring the solenoid coil circuit; and
through the signal circuit interfaced with the solenoid coil circuit, providing a information signal to the operator that the solenoid is again installed and operational in its service location.

12. An improved electric solenoid of the type in which a metallic core is slidably disposed within an armature coil formed from an armature wire wound onto a bobbin, Such that when the armature coil is electrically energized, the core is magnetically retracted into the armature coil, wherein the improvement comprises:
a base removably attachable to and detachable from the bobbin, the base including an electrical conductor and at least one electrical contact attached to the conductor, wherein the electrical contacts complete an electric circuit between the conductor and the armature wire when the bobbin is installed on the base, and break the electric circuit, thereby providing a supervisory signal, when the bobbin is removed from the base.

13. The solenoid base of claim 12, wherein the base has the shape of a hollow cylinder.

14. The solenoid of claim 12, wherein the conductor has upper and lower surfaces, and further including an upper insulating member attached to the upper surface of the conductor, and a lower insulating member attached to the lower surface of the conductor.

15. The solenoid of claim 14, further including at least one flexible member attached to the upper insulating member to allow compressive contact between the base and the bobbin without damage to the base or to the bobbin.

16. The solenoid of claim 14, wherein the bobbin has upper and lower surfaces, and wherein the lower surface of the bobbin is insulated to limit electric current flow to the desired path.

17. The solenoid of claim 12, further including a device associated with the base for biasing the base against the bobbin.

18. The solenoid of claim 17, wherein the device is a coil spring.

19. The solenoid of claim 12, further including a retainer associated with the solenoid for retaining the bobbin on the base.

20. The solenoid of claim 19, wherein the retainer is a cap removable from the solenoid.

* * * * *